United States Patent [19]

Omae et al.

[11] 4,447,805
[45] May 8, 1984

[54] APPARATUS FOR MEASURING TEMPERATURE OF COKE OVENS

[75] Inventors: Yoshihiro Omae; Noboru Okubo; Keiichi Sigyo; Hideo Nakajima; Hiroaki Fukui; Toshio Yamada; Hideyuki Honda, all of Kitakyushu, Japan

[73] Assignee: Mitsubishi Kasei Kogyo Kabushiki Kaisha, Tokyo, Japan

[21] Appl. No.: 349,909

[22] Filed: Feb. 18, 1982

[30] Foreign Application Priority Data

Feb. 23, 1981 [JP] Japan .................................. 56-25266
Nov. 11, 1981 [JP] Japan ................................ 56-179814
Nov. 26, 1981 [JP] Japan ................................ 56-188391

[51] Int. Cl.$^3$ .......................... G08B 1/08; C10B 47/00
[52] U.S. Cl. ..................................... 340/539; 340/501; 340/584; 340/589; 340/600; 340/870.17; 201/1; 202/270; 374/141; 374/149
[58] Field of Search .................... 340/539, 590, 870.01, 340/870.16, 870.17, 500, 501, 584–589, 593, 596–598, 600, 679; 201/1; 202/270, 239; 374/141, 142, 149

[56] References Cited

U.S. PATENT DOCUMENTS

| 3,333,476 | 8/1967 | Hardy et al. ................... 340/870.17 |
| 3,501,380 | 3/1970 | Perch ..................................... 201/1 |
| 3,577,784 | 5/1971 | Kovacic ................................ 201/1 |
| 3,609,728 | 9/1971 | Quinn et al. ................... 340/870.17 |
| 4,003,803 | 1/1977 | Schmidt-Balve ....................... 201/1 |
| 4,045,292 | 8/1977 | Matsushita et al. .................... 201/1 |
| 4,344,819 | 8/1982 | Gerdes, Jr. ............................. 201/1 |

FOREIGN PATENT DOCUMENTS

| 46-35606 | 10/1971 | Japan .................................... 201/1 |
| 52-107002 | 3/1977 | Japan . |
| 7009106 | 12/1970 | Netherlands .......................... 201/1 |

*Primary Examiner*—Donnie L. Crosland
*Attorney, Agent, or Firm*—Oblon, Fisher, Spivak, McClelland & Maier

[57] ABSTRACT

In an array of coke ovens each including a plurality of combustion chambers having a plurality of flue nozzles, a measuring car equipped with a temperature measuring member runs above the array in a direction of the array or in a longitudinal direction of the combustion chambers so as to detect thermal radiations passing through the flue nozzles to measure combustion chamber temperature. The measured temperature is sent to a remote control room through antennae. Where a coal charging car of a Rahmen construction is used an antenna is also provided for the coal charging car so that even when the measuring car runs beneath the coal charging car, radio communication can be assured. The temperature of the combustion chambers can be readily and accurately measured by linearly running the measuring car whether combustion is effected in one or the other side of the combustion chambers.

12 Claims, 22 Drawing Figures

APPARATUS FOR MEASURING TEMPERATURE OF COKE OVENS

BACKGROUND OF THE INVENTION

This invention relates to apparatus for measuring the temperature of a coke oven, and more particularly automatic temperature measuring apparatus capable of measuring the temperature of the combustion chamber of a coke oven rapidly and at high accuracies.

Usually, several tens or more coke ovens, each including independent and alternately arranged carbonizing chambers and combustion chambers are arranged as an array.

The coking time in which coal is charged in a carbonizing chamber and then heated in a combustion chamber is influenced by such external factors as the moisture content and particle size of the loaded coal, for example, but the coking time is mainly determined by the temperature of the combustion chamber. Accordingly, the measurement of the temperature of the combustion chamber is one of the most important factors necessary for satisfactorily controlling the condition of manufacturing coke.

Heretofore, the measurement of the temperature of the combustion chamber has been made by selecting suitable one or more flue nozzles provided for the top plate of the combustion chamber, manually removing lids of flue nozzles and then measuring the temperature of the brick at the bottom of the combustion chamber with an optical pyrometer. Although it is necessary to complete the temperature measurement in a relatively short time, this method requires a relatively long time even with a skilled workman, so that it is impossible to complete the measurement for a large number of combustion chambers. Moreover, this method is accompanied by operator error.

Instead of using an optical pyrometer, the temperature can also be measured with a thermocouple disposed in an upper space of the combustion chamber, or with a thermocouple disposed at the upper portion of a partition wall between adjacent combustion chambers or in a refractory material at the upper portion of a hair pin. The former method, however, not only requires a complicated motion transmitting mechanism but also is accompanied by measurement error caused by a turbulent draft or turbulence of the gas flow velocity so that this method can not accurately measure the oven temperature. Further, since the latter method measures the temperature inside of the refractory material, the measured value lags the actual variation of the temperature in the combustion chamber. Thus, these two methods can not accurately and rapidly measure the temperature in the combustion chamber.

As disclosed in Japanese Laid Open Patent Specification No. 107002/1977, apparatus for measuring the temperature of the combustion chamber of a coke oven has been proposed in which on a coal charging car or a car running above the coke ovens are mounted apparatus for opening and closing a lid of a flue nozzle, a position detector for detecting the flue nozzle, a position adjusting device for aligning the axis of the flue nozzle with the center of a temperature measuring device, a temperature measuring member extending in the vertical direction and an elevating mechanism of the temperature measuring member, thus measuring the temperature of a combustion chamber at the time of charging coal in a carbonizing chamber.

According to this apparatus, however, since the temperature measuring member, for example a thermocouple, is inserted into the flue while the coal charging car is being stopped for measuring the temperature, it is inconvenient to measure, in a short time, the temperature of all combustion chambers so as to provide an adequate combustion control of the entire coke ovens. Usually, coal is charged at a period of 5 hours so that the temperature of the combustion chamber is also measured at a period of 5 hours with the result that it is impossible to continuously measure the temperature along the array of the coke ovens. Aforementioned prior art suggests the use of a radiation pyrometer as the temperature measuring member, but since it measures the temperature when the position adjusting device and the elevating mechanism are standstill, the same disadvantage also occurs.

SUMMARY OF THE INVENTION

Accordingly, it is an object of this invention to provide an improved temperature measuring apparatus of coke ovens capable of measuring successively and in a short time the temperature of a member of combustion chambers of an array of coke ovens.

Another object of this invention is to provide an improved temperature measuring apparatus of coke ovens capable of opening the lids of the flue nozzles, measuring the temperature in the combustion chambers, and closing the lids, successively and continuously while a measuring car runs successively through respective temperature measuring points.

Another object of this invention is to provide a temperature measuring apparatus of coke ovens which automatically opens and closes the lids of flue nozzles, and measures the flue temperature only for a flue nozzle through which the flue temperature is to be measured.

Yet another object of this invention is to provide an improved temperature measuring apparatus of coke ovens in which a maximum one of the temperatures at various points of respective flue nozzles through which the temperature is measured continuously is determined as the temperature of a specific combustion chamber for which a specific flue nozzle is provided.

A further object of this invention is to provide a temperature measuring device of coke ovens in which starting, stopping, etc. of a measuring car are controlled by a signal from an external or remote control room and in which the measured data are transmitted to the control room for processing the data by maintaining communications between the measuring car and the control room irrespective of the position of the measuring car.

Still further object of this invention is to provide a temperature measuring apparatus of coke ovens in which a battery mounted on a measuring car for the purpose of running the same is automatically connected to a charging device when the temperature measurement is completed and in which charging is commenced only after the measuring car has stopped and the electrical connection between the battery and the charging device has been completed, thus assuring safe and positive charging.

Another object of this invention is to provide a temperature measuring apparatus of coke ovens wherein the temperature measuring apparatus is mounted on a measuring car independently running of a coal charging car and wherein measured data can be transmitted to a remote control room regardless of the relative position of the measuring car and the coal charging car.

According to this invention there is provided a temperature measuring apparatus for coke ovens which are arranged in an array, each coke oven including a plurality of combustion chambers respectively provided with a plurality of flue nozzles at their tops, the apparatus being of the type comprising a measuring car running on rails disposed above the array and extending in the direction thereof or in a longitudinal direction of the combustion chambers and a temperature measuring member mounted on the measuring car for receiving thermal radiations emitted by the combustion chambers through the flue nozzles, characterized in that there are provided means for continuously running the measuring cars on the rails, radio transmitting means mounted on the measuring car for transmitting data measured by the temperature measuring member as an electric signal, and radio receiving located in a remote control room for converting received electrical signal into a signal representing measured temperature.

BRIEF DESCRIPTION OF THE DRAWINGS

In the accompanying drawings:

FIG. 1 is a diagrammatic representation of an Otto type coke oven;

FIG. 2 is a front view of a measuring car utilized in the temperature measuring apparatus of this invention;

DESCRIPTION OF THE PREFERRED EMBODIMENTS

Figure 3:
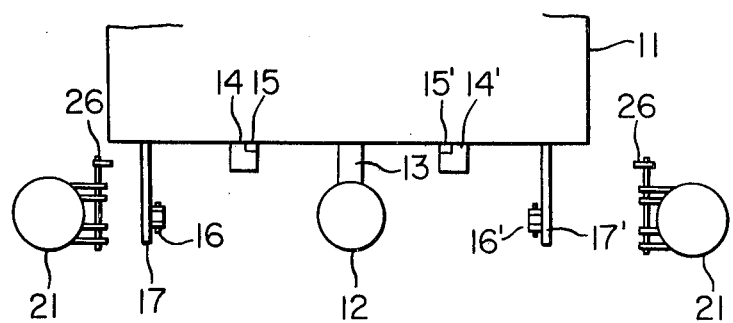
FIG. 3 is a plan view of the measuring car shown in FIG. 2.

Before describing in detail the preferred embodiments of this invention, the method of measuring the temperature of coke ovens will firstly be outlined.

Generally, the temperature of each combustion chamber is measured in the direction of the array of a plurality of coke ovens or in the longitudinal direction of each combustion chamber. Usually, one half of the burners installed in combustion chambers juxtaposed in the length of the oven are operated, and a predetermined time after, these burners are stopped while at the same time the other half of the burners are operated. Both halves of the burners are alternately operated and stopped. When the lid of a flue nozzle is opened during combustion, the temperature of the flame in the combustion chamber would be measured instead of the temperature of the brick surface at the bottom of the combustion chamber. The temperature in a combustion chamber increases from a pusher side toward the discharge side and the central portion along the length of the oven is at an average temperature. For this reason, when the temperature of the oven is measured through a flue nozzle nearest the center of a quiescent (not burning) oven, the result of measurement would not be affected by the combustion in the combustion chamber. This is advantageous because the average temperature in the combustion chamber is measured. Accordingly, it is advantageous to measure the temperature through a flue nozzle nearest the center of a quiescent oven of the array.

The construction of the heating flue of a coke oven may be classified into the following two types. One type is represented by an Otto type oven as shown in FIG. 1 in which the pusher sides 1a, 3a, . . . of odd numbered combustion chambers 1, 3, . . . are burnt, while the discharge sides 2b, 4b, . . . of even numbered combustion chambers, 2, 4, . . . are burnt at the same time. A predetermined time after (for example after 20 minutes) the opposite side, that is the discharge side of odd numbered combustion chambers are burnt, whereas the pusher side of the even numbered combustion chambers are burnt. Considering only two rows of the flue nozzles closest to the centers of respective combustion chambers among a plurality of rows, the combustion chambers that are burning are staggered as shown by broken lines A and B shown in FIG. 1. Accordingly, to measure successively the temperature of respective combustion chambers with a temperature measuring member mounted on a measuring car running in the direction of the array, it is necessary to move the temperature measuring member along the dotted lines A and B shown in FIG. 1. However, it is almost impossible to open and close the lids of the flue nozzles and measure the temperature without stopping the car.

According to this invention, in the case of the Otto type coke ovens shown in FIG. 1 the lids of alternate flue nozzles arranged on straight dotted lines C and D are opened, the temperature is measured through the opened lids and then the lids are closed while the car continuously moves in one direction along the array. When the car reaches a combustion chamber at one end of the array and the burning portions are changed from one side to the other side of the center line, the car is controlled to run in the opposite direction for alternately measuring the temperature through remaining flue nozzles. More particularly, the temperature of the odd numbered combustion chambers 1, 3, ... is measured along the broken line C until the other end is reached, and then the direction of the car is reversed to measure the temperature of even numbered combustion chambers. Accordingly, while the car is moved in one direction, the lids of the even numbered combustion chambers are prevented from opening and while the car is moved in the opposite direction, the lids of the odd numbered combustion chambers are prevented from opening.

In a construction represented by Carl Steel type coke ovens, the same side (for example the pusher side 1a, 2a, ...) of respective combustion chambers are firstly burnt and after a predetermined time, for example 20 minutes, the opposite or discharge side is burnt. Thus, both sides are alternatively burnt at a predetermined interval. Accordingly, for the coke ovens of this type, for one side in which combustion is not made, the temperature measuring member is moved continuously in the same direction and lids of all flue nozzles are sequentially opened and closed for temperature measurement.

As above described, to measure the temperature in the direction of the array, it is necessary to change the manner of temperature measurement dependent upon the type of the coke ovens. Thus, in the case of the Otto type ovens, temperature measurement should be made for alternate combustion chambers. The temperature measuring apparatus of this invention is constructed to be applicable to any type of the oven as will be described hereinbelow.

Figure 4:
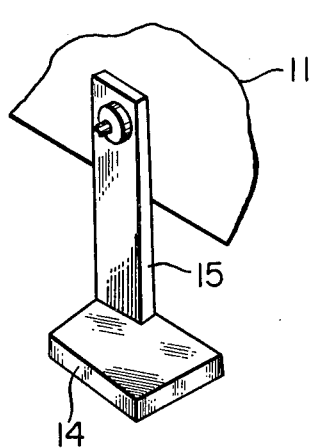
FIG. 4 is a perspective view showing a lid opening member.

As shown in FIGS. 2 and 3 a temperature measuring car 11 running along rails installed on the array of the coke ovens is provided with a pyrometer 12 in the form of a monochromatic or dichromatic or trichromatic pyrometer, a thermal radiation pyrometer, infrared pyrometer or any pyrometer utilizing thermal radiations, the pyrometer 12 projecting in a direction perpendicular to the direction of running of the measuring car. As shown in FIG. 3, the pyrometer 13 is supported by an arm 13 such that it successively passes over respective flue nozzles to be measured as the measuring car runs. Thus, when the lid of a given flue nozzle is open the pyrometer detects thermal radiations from the furnace bottom to measure the temperature. Plate shaped lid opening members 14 and 14' are supported at horizontal positions by supports 15, 15' on one side of the car 11 as shown in FIGS. 2, 3 and 4. Paddle shaped lid closing members 16 and 16' are hinged to one side of the car 11 to be rotatable in the directions shown by arrows in FIG. 2.

Figure 6:
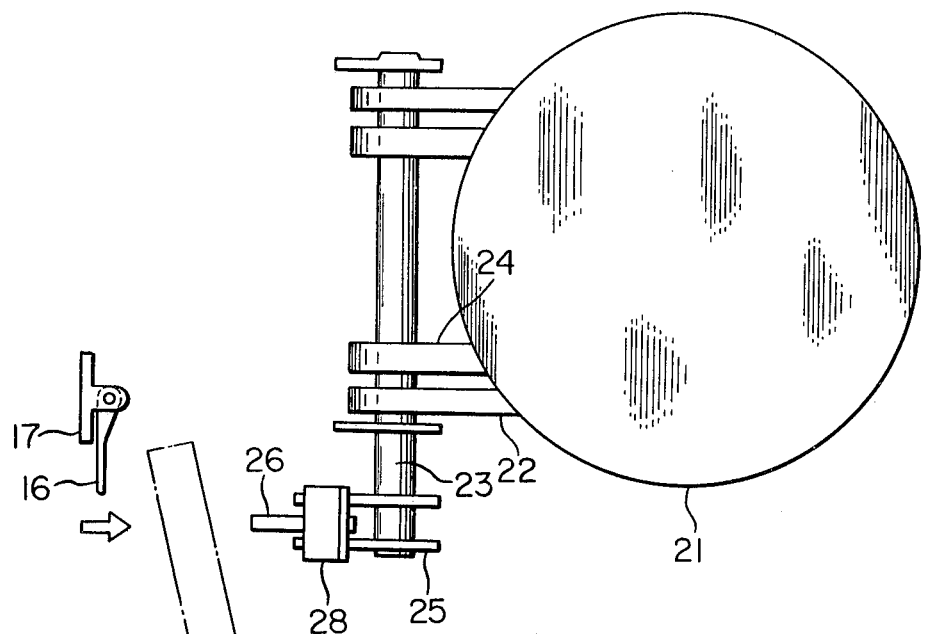
FIG. 6 is a plan view showing a lid of a flue nozzle utilized in this invention.
Figure 7:
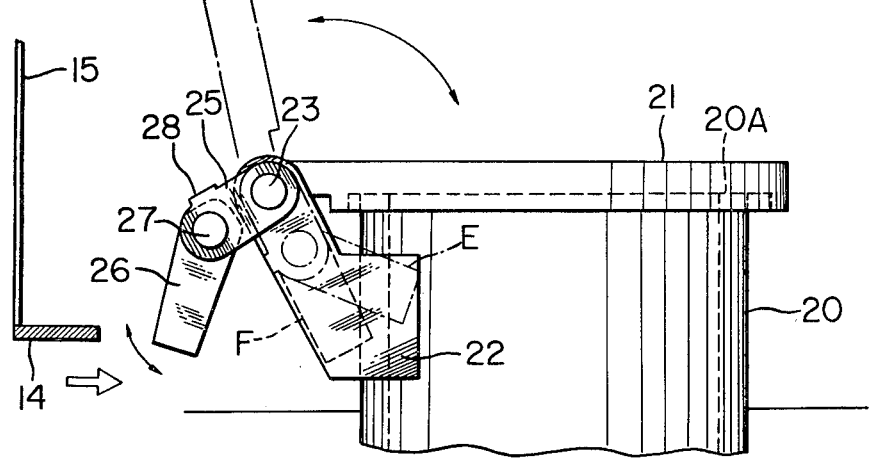
FIG. 7 is a side view, partly in section, showing the flue nozzle and the lid shown in FIG. 6.

As shown in FIGS. 6 and 7, a cylindrical flue nozzle 20 has an upper opening 20A which is opened and closed by a lid or cover 21 having bearing levers 22 with their one ends secured to one side of the flue nozzle 20. The other ends of the bearing levers 22 are mounted on a shaft 23, and lid operating levers 24 are secured to the shaft 23. Arm 25 is secured to one end of the shaft 23 and a lever 26 is pivotally connected to the arm 25 through a pin 27. A projection 28 acting as a stop is provided for the arm 25.

Figure 8:
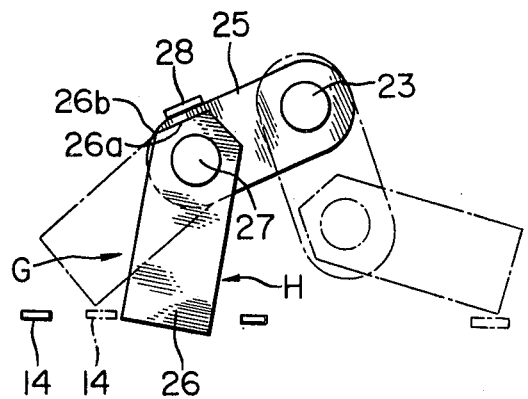
FIG. 8 is a side view showing the detail of the lid operating mechanism shown in FIGS. 6 and 7.

As shown in FIG. 8, one end of the lever 26 comprises a straight portion 26a and a curved portion 26b so that when the lever 26 is pressed in a direction of arrow G, the lever 26 tends to rotate about pin 27 in the counterclockwise direction and after the straight portion 26a reaches and presses the stop 28, the lever 26, the arm 25 and the shaft 23 would rotate integrally. As the shaft 23 rotates, the lever 24 secured to the shaft 23 is also rotated to open the lid 21. On the other hand, as the lever 26 is pressed in the opposite direction shown by arrow H, only the lever 26 rotates about the pin 27.

Figure 9:
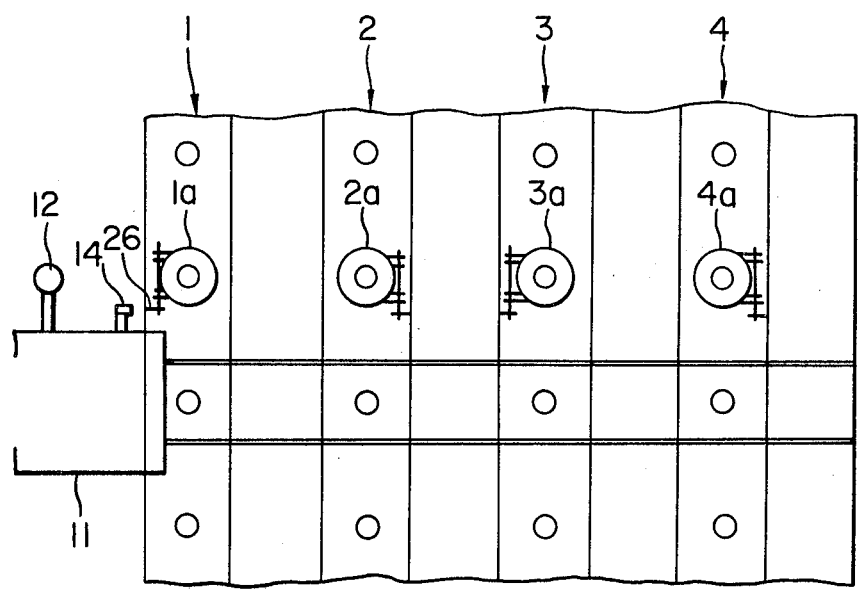
FIG. 9 is a plan view showing the arrangement of lids for the Otto type ovens.
Figure 10:
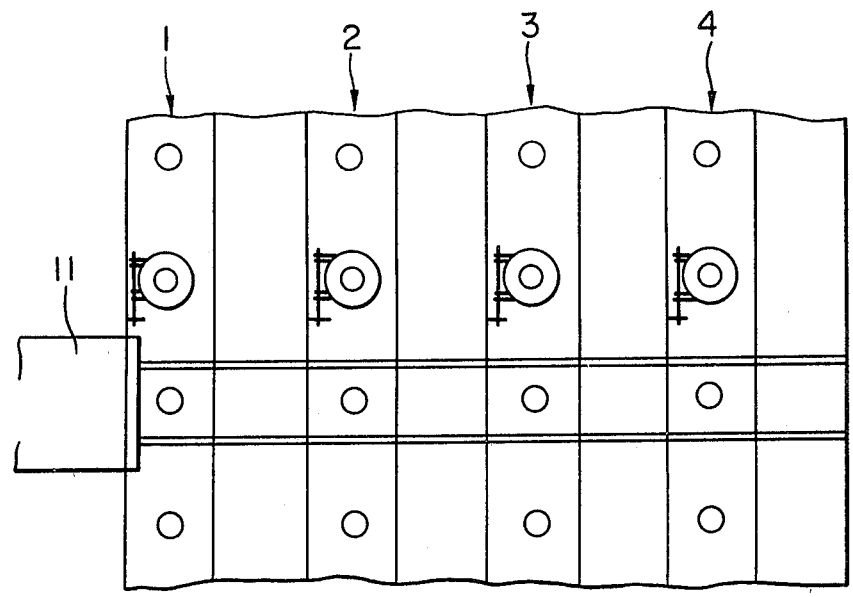
FIG. 10 is a plan view similar to FIG. 9 for the Carl still type ovens.

According to this invention, for the Otto type ovens, the lids having a construction as above described are mounted as shown in FIG. 9 with their directions alternatively reversed, and for the Carl still type ovens the lids are mounted in the same direction as shown in FIG. 10 so that as the measuring car 11 runs along rails 29 and 29' on the array, only predetermined flue nozzle lids are sequentially opened and closed to measure the temperature.

How to measure the temperature of the combustion chambers by using the furnace temperature measuring apparatus of this invention will now be described.

At first, a case in which the temperature is measured in the direction of the array of the Otto type coke ovens will be described. Suppose now that the pusher sides 2a, 4a, ... of even numbered combustion chambers and the discharge sides 1b, 3b, ... of the odd numbered combustion chambers 1, 3, ... are burning. In this case where the temperature is to be measured on the pusher sides, temperature measurement is possible for quiescent odd numbered combustion chambers 1a, 3a, ... When the measuring car is started from the combustion chamber 1 it soon reaches the flue nozzle thereof so that the lid opening lever 14 provided for the measuring car 11 engages against the lever 26 of the lid of that flue nozzle. In this case, since the lever 14 pushes the lever 26 in the direction G shown in FIG. 8, the lid will be opened in a manner as has already been described. As the measuring car runs further, the temperature measuring member 12 passes above the flue nozzle with its lid open, thus measuring the temperature of the furnace bottom. Following this, the lid opening lever 14' passes by the lever 26, but at this time, since the lid has already been opened, no change occurs. Moreover, as the lid closing member 16' engages the opened lid, the member 16' pushes the lid to close the same. As the measuring car advances further, it reaches the flue nozzle of the combustion chamber 2 so that the lid opening member 14 engages the lever. However, the lids of the even numbered combustion chambers are oriented oppositely, the lever is pushed against the lids of odd numbered combustion chambers in the direction of H shown in FIG. 8, so that only the lever 26 rotates and the lid will not be opened. The opening lever 14' passes the lever 26 in the same manner. As above described, the measuring car passes above the combustion chamber 2 without opening the lid and hence without measuring the temperature. By the same operation, for the odd numbered combustion chambers in which combustion is not produced, the operations of lid opening and lid closing and temperature measurement are performed, whereas for odd numbered combustion chambers in which combustion occurs, the measuring car merely passes over these combustion chambers without measuring their temperatures.

As above described, the measuring car reaches the other end of the array after measuring the temperature of all quiescent combustion chambers. Thereafter, when the combustion regions are changed to the opposite side, the measuring car runs in the opposite direction. With respect to the quiescent even numbered combustion chambers the lids are opened and then closed between which their temperature is measured, whereas for the burning odd numbered combustion chambers, lid opening and closing and temperature measurement are not performed and the measuring car merely passes over them. Thus, when the measuring car returns to the start position, the temperature measurement of all combustion chambers is completed.

In the case of the Carl still type coke oven, lids are mounted on the flue nozzles in the same direction as shown in FIG. 10. When the combustion does not occur on one side on which lids operated by the measuring car are provided, the measuring car runs in a direction in which the lids are opened and closed. For example, in the case shown in FIG. 10, when the combustion on the pusher side is not made, it is possible to measure the temperature of all combustion chambers by running the measuring car starting from the combustion chamber 1. For this reason, it is not necessary to measure the temperature during both the go and return strokes. After completion of the measurement of the temperature of all combustion chambers, the measuring car may be returned to the starting position 1 before commencing next measurement.

Figure 5:
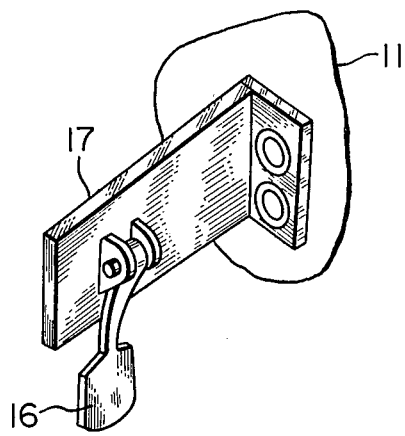
FIG. 5 is a perspective view showing a lid closing member.
Figure 11:
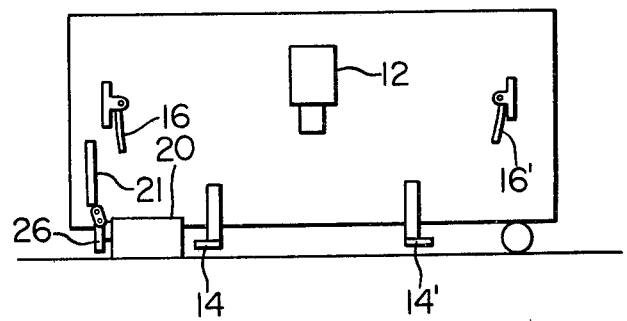
FIG. 11 is a side view showing a relation of an opened lid and a lid closing member.

It will be clear that the lids are opened for inspecting or cleaning the inside of the combustion chambers. When the measuring car runs while the lids are open, the lid closing member would collide against opened lids. Especially, as shown in FIG. 11, when the lid closing member collides against an opened lid tending to open it further, the lid would be broken. However, according to this invention, as shown in FIG. 5, the lid closing member is constructed such that it can rotate in a direction opposite to the lid closing direction so that it is possible to prevent such breakage. Moreover, as the measuring car runs, the lid opening lever 14 pushes the lever 26 to close the lid, thus closing inadvertently left open lid. Accordingly, it is possible not only to prevent temperature measurement through a flue nozzle with its lid just closed, but also to prevent collision of the lid closing member 16' against the lid.

Figure 12:
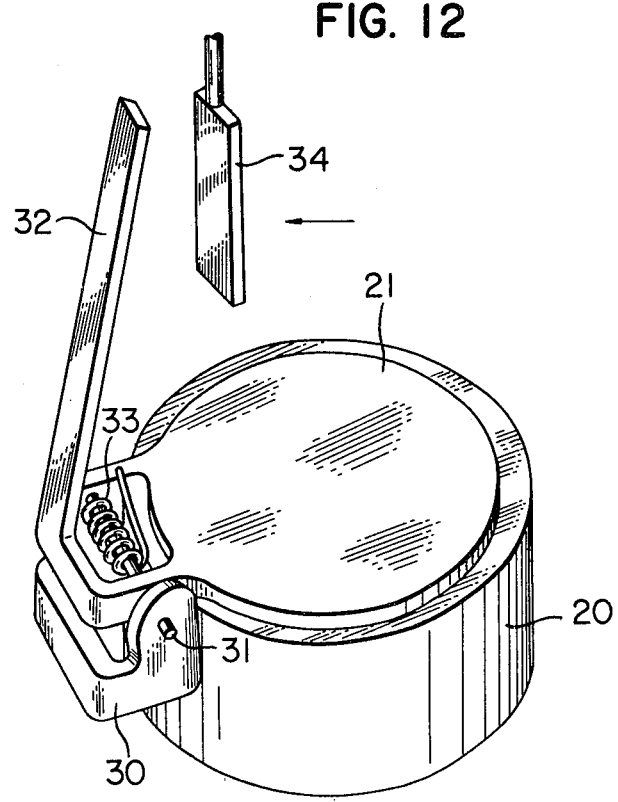
FIG. 12 is a perspective view showing a modified lid.

FIG. 12 shows a modified lid utilized in this invention. This modified lid 21 comprises a lid mounting member 30 secured to the cylindrical flue nozzle 20, a hook 32 pivotally mounted on a pin 31 and a spring 33 surrounding the pin 31 for biasing the lid toward closed position. With this construction, as the measuring car runs in a direction shown by an arrow, a kick plate 34 secured to the car engages the hook 32 to open the lid. When the lid is opened the temperature measuring member carried by the measuring car passes by the flue nozzle to measure the oven temperature. After the measurement, the kick plate disengages the hook 32 so that the lid is closed by the spring 33.

When these modified lids are mounted on the Otto type coke ovens it is necessary to alternately change the orientation of the lids for the reason described above. More particularly, it is necessary to alternately locate the hook on the left and right sides as viewed in FIG. 12, and to open alternate lids with the kick plate 34 as the measuring car runs so as to measure the temperature of only the quiescent combustion chambers. The kick plate 34 is mounted on the measuring car such that the kick plate can rotate only in a direction opposite to the direction of advance of the measuring car. Then, the kick plate 34 approaches the hook 32 in a direction shown by the arrow in FIG. 12, the kick plate 34 rotates the hook 32 to open the lid, whereas in the opposite case, since the hook 32 can not rotate, the kick plate rotates and the measuring car advances without opening the lid. This construction is suitable for the Otto type coke ovens with hooks alternately oriented.

Figure 13:
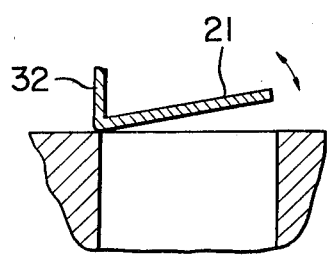
FIGS. 13 and 14 are sectional views showing the other modifications of the lid.

FIG. 13 shows a modified lid useful for a flue nozzle not projecting above the top surface of a combustion chamber. Although the lid mounting structure is not shown in FIG. 13, a structure identical to that shown in FIG. 12 can be used. Accordingly, the lids can be opened and closed with a kick plate having the same construction as above described. The kick plate may take the form of a roller or a L shaped arm.

Figure 14:
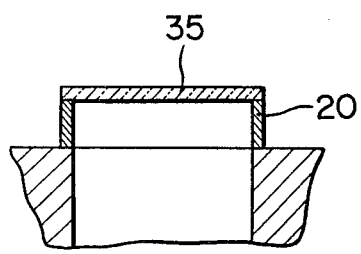

In a modified embodiment shown in FIG. 14, a quartz glass plate 35 is mounted on a cylindrical flue nozzle 20 through a packing, not shown. In this case, since it is possible to measure the thermal radiations from the oven bottom through the quartz glass plate 35, any lid mounting structure and kick plate is not necessary. However, as it is necessary to wipe or clean the surface of the quartz glass plate 35 at the time of measurement, it is advantageous to substitute a wiper for the kick plate.

Figure 15:
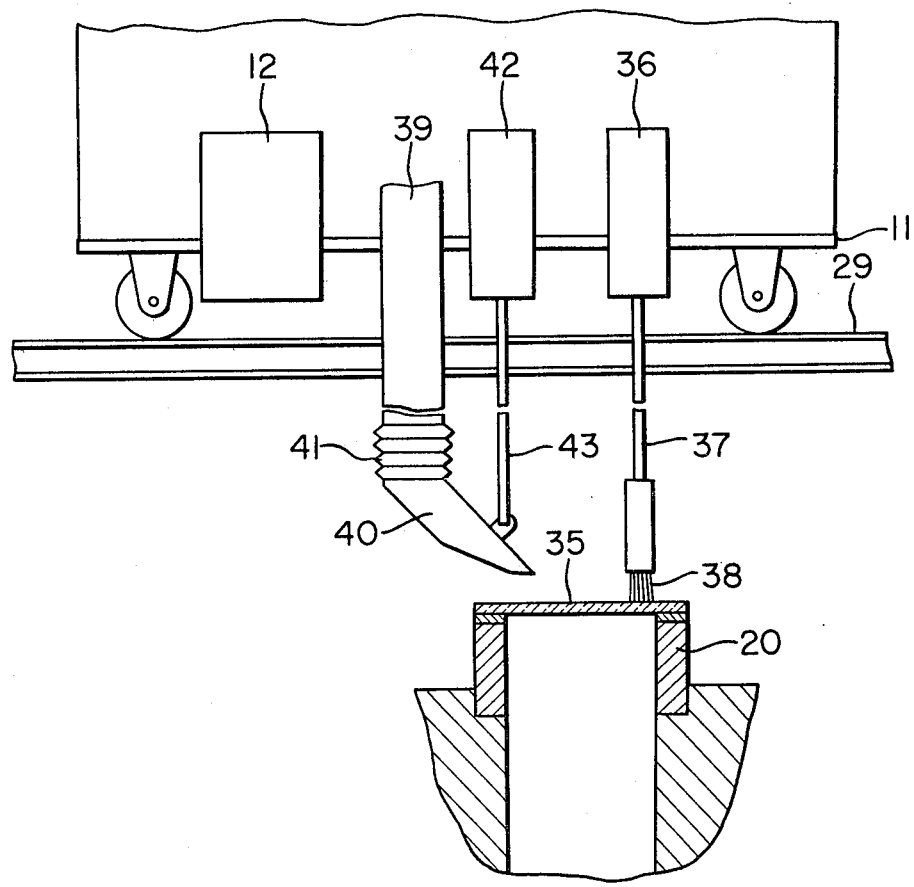
FIG. 15 is a side view showing the detail of a wiper.

FIG. 15 shows one example of the wiper comprising a cylinder 36, a brush 38 mounted on the lower end of a piston rod 37, an air nozzle 40 connected to a conduit 39 through a flexible tube 41, a cylinder 42 and a piston rod 43 thereof connected to the air nozzle 40. The wiper is mounted on the measuring car 11 near the temperature measuring member 12.

When the temperature measuring apparatus of this invention incorporated with the wiper described above is operated in a manner as above described, the brush 38 wipes the surface of the quartz glass plate, and compressed air obliquely ejected from the air nozzle 40 cleans the quartz glass plate.

With a flue nozzle covered with a transparent quartz glass plate as shown in FIG. 14 it is possible to measure the temperature of a combustion chamber whether it is burning or not. However, which one of the sides of a combustion chamber should burn or not is alternately determined at a precisely controlled interval so that it is possible to readily determine that whether the measured temperature data represent the burning state or not burning state. Accordingly, at the time of processing the data, the data obtained at the not burning state are selected.

Although the foregoing description refers to a measurement in the direction of the array of coke ovens, it will be clear that the invention is also applicable to a case where the measurement is made in the longitudinal direction of an oven in which case the direction of mounting the lids is rotated 90°. In the same manner as above described, the measuring car runs along the longitudinal direction of a combustion chamber to measure the temperature of a portion not burning. After exchanging the burning sides, the other half side is measured. The timing control of such measurement may be automatically effected by a timer or the like.

Measurement in the longitudinal direction should be made for a plurality of, preferably for all coke ovens comprising an array. To accomplish this object it is necessary to move the measuring car not only in the longitudinal direction of the combustion chambers, but also in the direction of the array. Thus, a specific combustion chamber is selected and the temperature thereof is measured by moving the measuring car in the direction of the array and then in the longitudinal direction of the combustion chamber.

Figure 16:
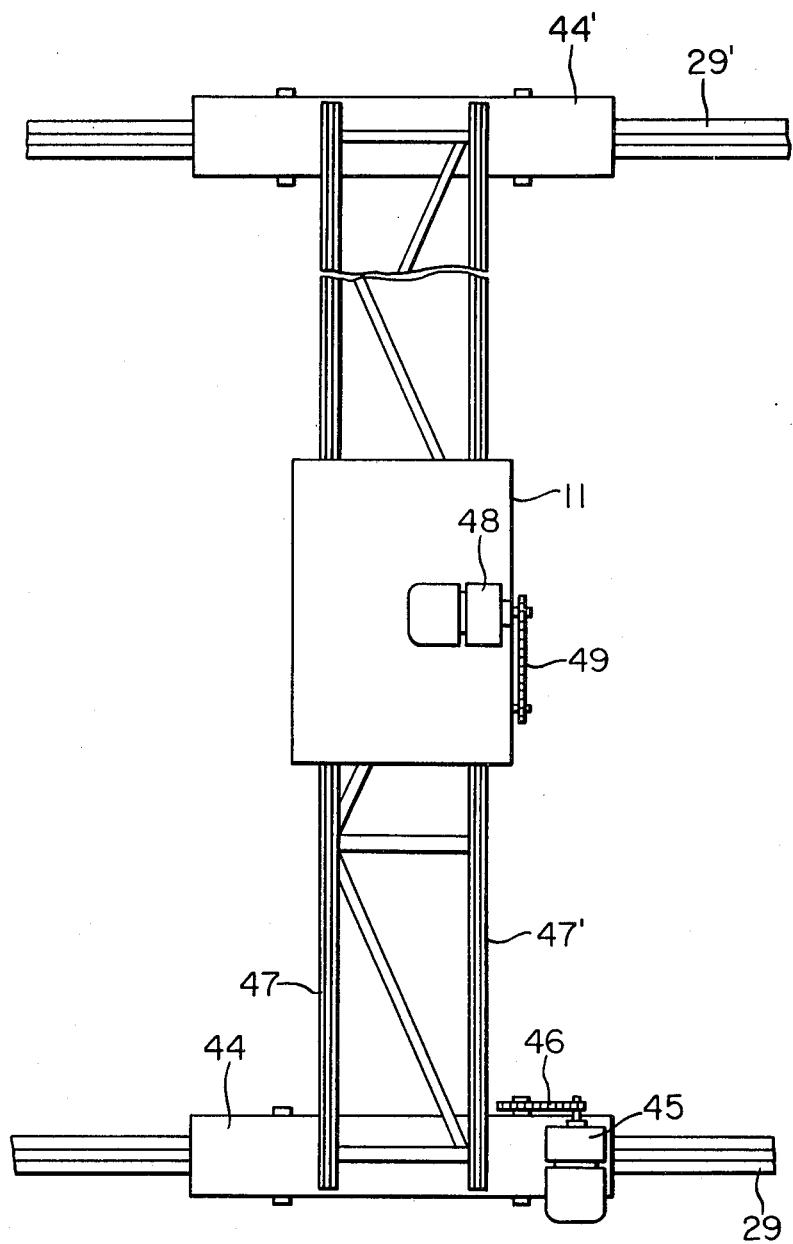
FIG. 16 is a plan view showing a measuring car capable of running in the longitudinal direction of combustion chambers and in the direction of an array of coke ovens.

To move the measuring car in both directions, as shown in FIG. 16 first rails 29 and 29' are installed on both the pusher side and the discharge side. Two carriages 44 and 44' are provided to run on respective rails, and second rails 47 and 47' are provided between the two carriages to extend in the longitudinal direction of the combustion chamber. A measuring car 11 is mounted on the second rails 47 and 47' to run thereon. Thus, the measuring car is positioned on a specific combustion chamber to be measured by moving the two carriages along the first rails in the direction of the array. Thereafter, the measuring car is moved along the second rails, that is in the longitudinal direction of the specific combustion chamber.

Each of the carriages 44 and 44' is provided with wheels, not shown, on its lower surface which ride on rails 29 and 29'. The wheels of the carriage 44 are driven by an electric motor 45 mounted thereon through a chain 46. The measuring car 11 moved by an electric motor 48 mounted thereon through a chain 49. In FIG. 16 only the means for moving the measuring car in the direction of the array and in the longitudinal direction of the array are shown.

A case wherein the temperature is measured for all flue nozzles will be described as follows.

At first, the carriages 44 and 44' are moved to position the measuring car above an endmost combustion chamber of the array. Then, the measuring car 11 is moved in the longitudinal direction to an end position of the combustion chamber. The measuring car is started from this position to successively measure the temperature of the bottom through respective flue nozzles of the same combustion chamber. In this case, the lid mounting structures of respective flue nozzles are rotated 90° so as to position the hooks 25 at positions 90° rotated (that is in a direction in which a line interconnecting the lid mounting structure and the hook is oriented in the longitudinal direction of the combustion chamber). In other words, the kick plate 18 is mounted such that its surface is oriented in the longitudinal direction of the combustion chamber so that when the kick plate 18 is moved in the longitudinal direction by the carriages, the kick plate 18 engages the hook 25 to open the lid 24.

In this manner, it is possible to measure the bottom temperature of a combustion chamber through all flue nozzles thereof by moving the measuring car 11. When the measurement of one combustion chamber is completed, the carriages 44 and 44' are moved to bring the measuring car above the next combustion chamber for measuring the temperature thereof in the same manner as above described. By repeating this process the temperature of all combustion chambers can be measured.

To make possible the temperature measurement through the flue nozzles in the direction of array or in the longitudinal direction of the combustion chambers, the construction of the lid is changed. For example, the position of mounting the lid to the cylindrical flue nozzle may be shifted 45° from the position shown in FIG. 9. The kick plate 16 is designed to have a relatively wide area and oriented in a different direction. With these modifications, the lids are opened when the kick plate 16 is moved in the direction of the array and in the longitudinal direction of the combustion chamber. Consequently, it becomes possible to measure the temperature through a flue nozzle at a specific position of the combustion chamber, as well as through all flue nozzles of all combustion chambers.

As above described according to this invention, thermal radiations through flue nozzles are measured by the measuring car continuously running above coke ovens, and it is advantageous to process the measured data in the following manner.

More particularly, the portion of the top surface of a combustion chamber other than the flue nozzles is at a relatively high temperature. The temperature measured through an open flue nozzle is relatively low near the periphery of the opening but the temperature increases toward the center of the opening. For this reason, it is necessary to measure the temperature at a specific point in the opening. Selection of the specific point is difficult and even when the center of the opening is selected as the measuring point, it is difficult to control to precisely position the temperature measuring member at the measuring point.

For the reason described above, according to this invention, among continuously varying data measured through a flue nozzle, the temperature having the largest value is selected as the measured temperature. More particularly, the measured data is successively sampled at a definite interval and the firstly sampled data is compared with the next sampled data. Then a smaller data is erased while a larger one is stored and the stored data is compared with the data at the next sampling point and so on.

Thus, among various measured data obtained through one flue nozzle, the largest one is used as the temperature of that flue nozzle.

Figure 17:
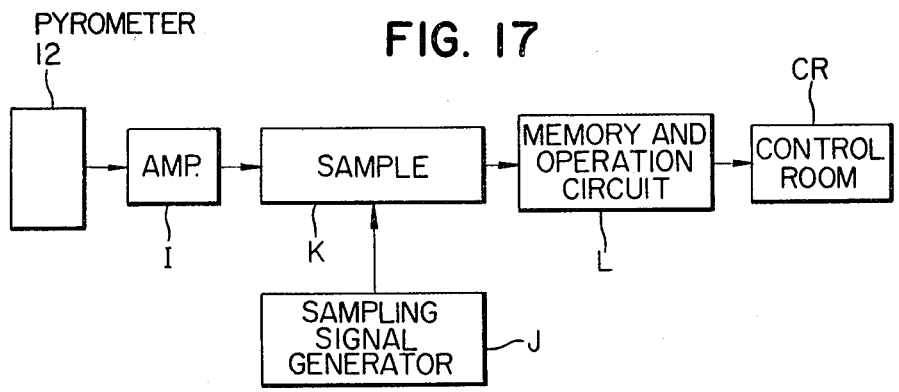
FIG. 17 is a block diagram showing a data processing circuit.

FIG. 17 shows a block diagram of a circuit for processing the measured data in a manner described above. As shown in FIG. 17, the output signal of the temperature measuring member 12 is amplified by an amplifier I and then sampled by a sampler K at a predetermined interval by a sampling signal generated by a sampling signal generator J or at each predetermined travel of the measuring car. The sampled signal is then converted into a digital signal and stored in a memory and operational circuit L. In this circuit, a firstly stored data is compared with a next sampled data and the larger one is stored as it is, while the smaller one is erased. Then the next sampled data is compared with the stored data to erase the smaller one. In this manner, the largest one of the data measured through a specific flue nozzle is retained, and this largest data is sent to a control room CR. In this manner, as the maximum values of respective flue nozzles measured sequentially are determined, it is possible to determine the temperature in respective combustion chambers based on these maximum values. Furthermore, the data are processed to display the temperature in respective combustion chambers and to control the combustion state therein. In processing the data with the circuit shown in FIG. 17, it is also possible to successively compare analogue data outputted by the amplifier I. It is also possible to apply the analogue output from the amplifier I to the memory and operation circuit L to store only the maximum value. It is also possible to directly send the output of the temperature measuring member 12 to the control room CR to sample the output for determining the maximum value.

The output of the temperature measuring member 12 does not vary linearly with respect to the variation in the quantity of light or thermal radiations impinged upon the temperature measuring member. Accordingly, it is advantageous to use a linearizer to cause the output of the temperature measuring member to vary linearly in response to the variation in the amount of light and thereafter to process the data. Since this data processing introduces a time lag it is advantageous to decrease the running speed of the measuring car to a value lower than the response speed.

As above described, according to this invention, the measuring car runs independently of the loading car, so that it is possible to measure at a shorter interval, for example 20 minutes, than a case wherein the measuring car and the loading car are combined into an integral unit. Moreover, it is possible to measure the temperature at any desired time. This not only enables extremely fine control of the oven temperature but also production of coke of uniform quality at a low energy consumption. Since the loading car and the measuring car are independently run, it is necessary to control them from a remote control room through a wireless system.

Usually, the charging car has a Rahmen construction in which a bottom is elevated at the central portion to define a space of a definite height between the bottom and the upper surface of the oven, as will be described later. For this reason, where a charging car of the Rahmen construction is used, the measuring car runs through the space beneath the bottom of the charging car. However, while the measuring car runs beneath the charging car, the telecommunication between the measuring car and the control room becomes impossible thus disenabling the control of the measuring car and reception of the data transmitted therefrom. This invention can eliminate such defects by using improved means to be described hereunder.

Figure 18:
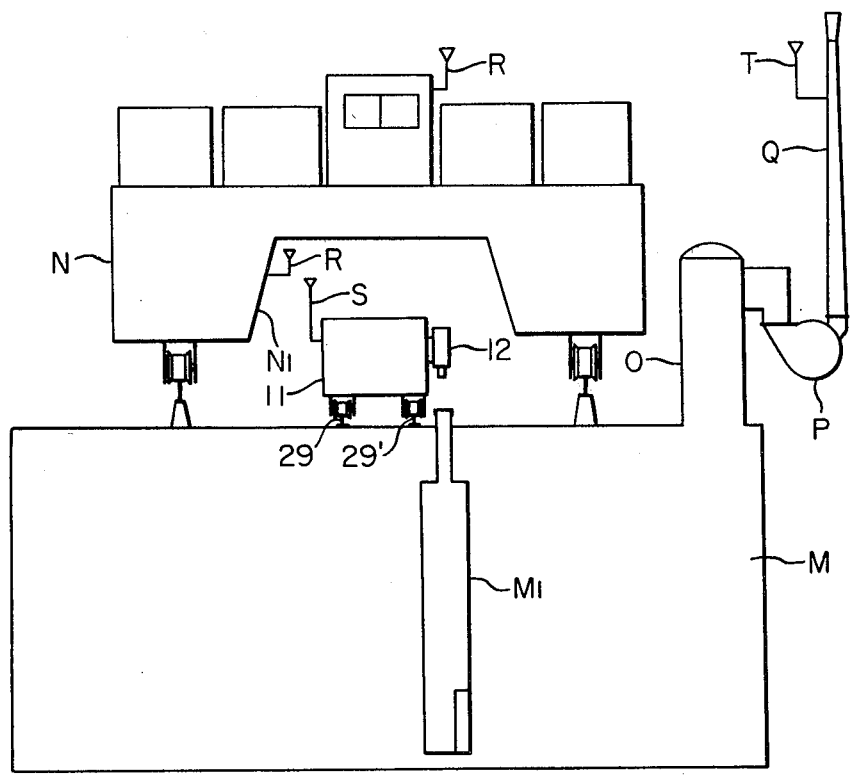
FIG. 18 is a side view showing a state in which a measuring car is located just beneath a loading car.

FIG. 18 shows a state in which the measuring car is located just beneath the charging car running on the coke ovens. In FIG. 18, M represents a coke oven having a plurality of combustion chambers $M_1$ and N a charging car of the Rahmen construction. The bottom surface of the charging car N is elevated at the central portion to define a hollow space $N_1$. Rails 29 and 29' are installed on the upper surface of the coke oven and beneath the space $N_1$. These rails extend in the direction of the array and the measuring car 11 runs on these rails. Each carbonizing chamber of the coke oven M is provided with a upright pipe O with its upper end connected to a collection main P for collecting gas generated by the coke oven. A plurality of bleeders Q are provided for the collection main P at a definite spacing for discharging the gas at a time of emergency. The charging car N, the measuring car 11 and the bleeders Q are provided with transmitting and receiving antennae R, S, and T respectively.

As above described, since the charging car N, the measuring car 11 and the bleeders Q are provided with antennae R, S, and T respectively, even when the measuring car 11 passes beneath the charging car N as shown in FIG. 18, the measuring car 11 can be controlled from a remote control room through telecommunication, and the data transmitted from the measuring car 11 can be accurately received by the control room. Due to the directivity of the radio wave when the measuring car 11 is covered by the charging car as shown in FIG. 18, reception of the signal is usually difficult. According to this invention, however, since communication is made through the antenna R mounted on the charging car N, satisfactory communication can be made. Especially, since a plurality of bleeders Q are provided at a predetermined spacing, the antennae T mounted on the bleeders Q assure satisfactory communication irrespective of the relative position of the charging car and the measuring car.

As above described, according to this invention, the measuring car runs independently of the charging car. For this reason, the measuring car is constructed to run by using a storage battery mounted thereon, so that it is necessary to periodically charge the battery. Accordingly, there is provided an automatic battery charging device as follows.

Figure 19:
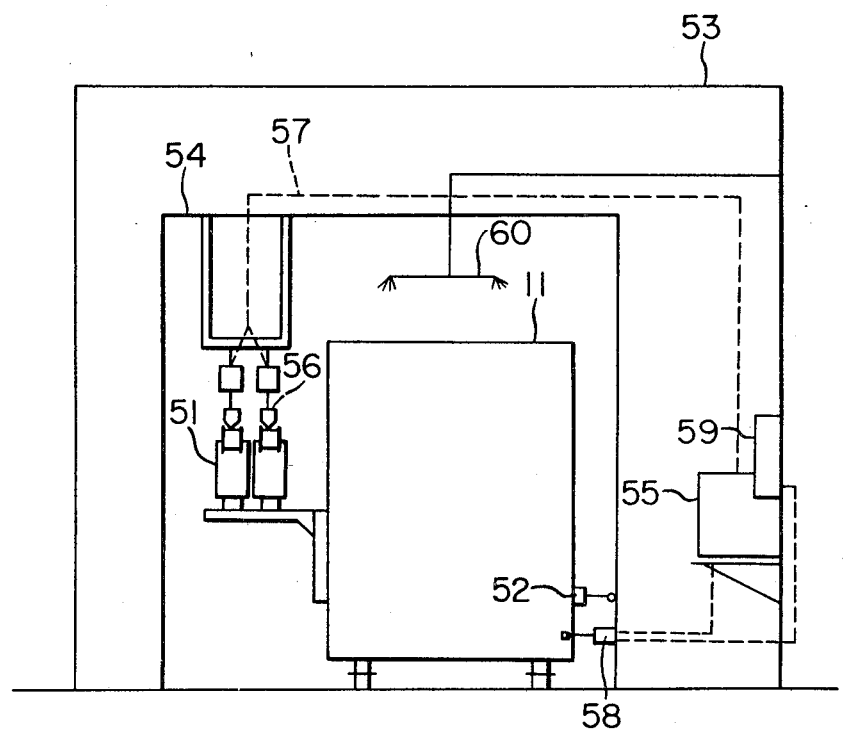
FIG. 19 is a front view showing a measuring car housed in a garage and a battery charging apparatus.
Figure 20:
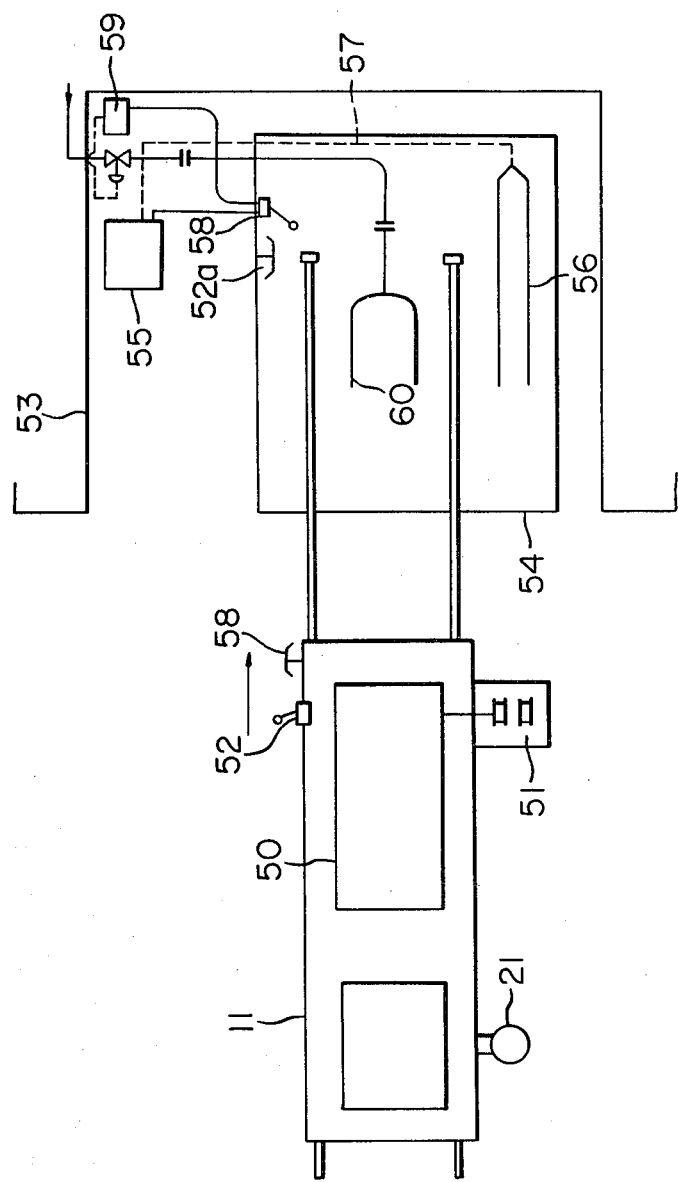
FIG. 20 is schematic plan view of the installation shown in FIG. 19.
Figure 21:
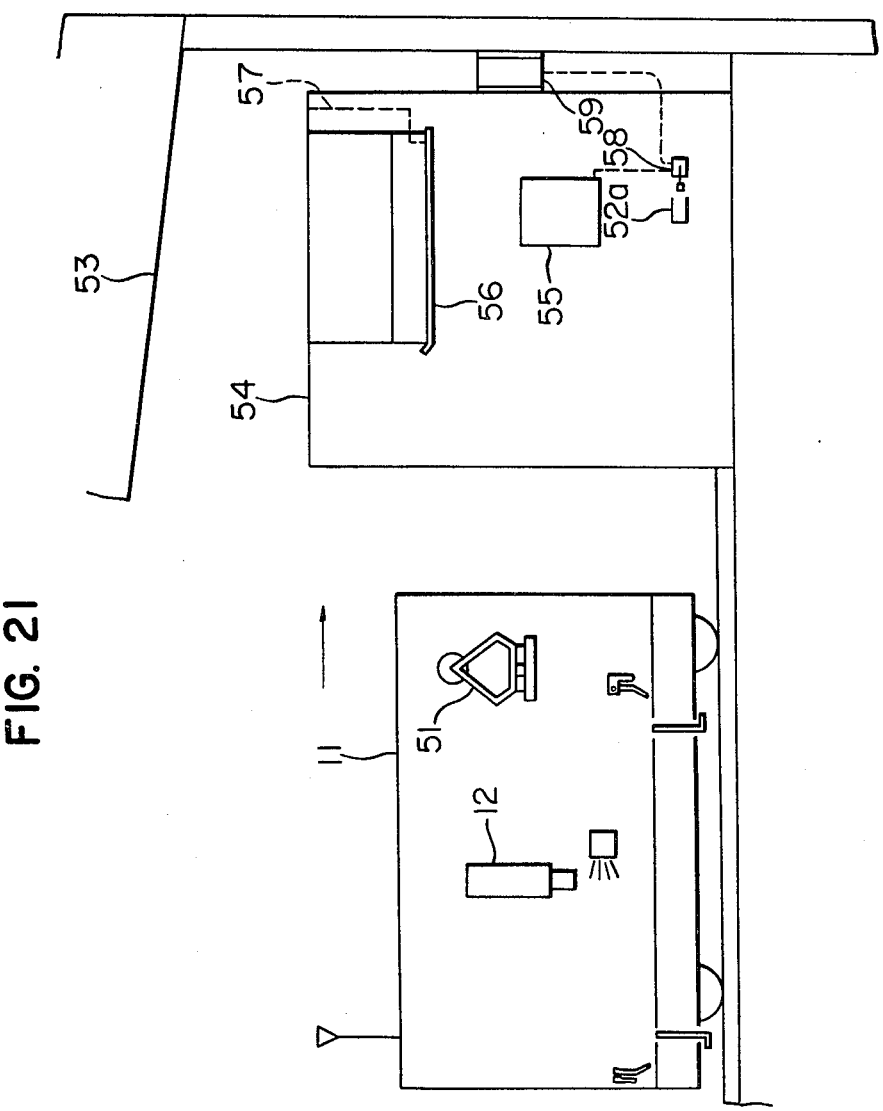
FIG. 21 is a side view showing a measuring car and its garage.

FIGS. 19, 20 and 21 show a measuring car garage installed on the outside of a combustion chamber at one end of the array and housing a battery charging device therein. In these drawings, 11 shows a measuring car, 12 a pyrometer for detecting thermal radiations and mounted on the measuring car, 50 a storage battery mounted on the measuring car, 51 a pantograph adapted to engage trolley wires to be described later for electrically connecting the battery to the charging device. There is also provided a first limit switch 52 operated by an operator $52_a$ installed in the garage. When closed, this limit switch 52 stops running of the measuring car, and at the same time interconnects the battery 50 and the pantograph 51. There are also provided a garage 53, a protective fence 54, a battery charging device 55, and trolley wires 56 which are connected to the charging device 55 through a cable 57. The trolley wires are installed to engage the pantograph 51 when the measuring car 11 is housed in the garage 53. Further, there are provided a second limit switch 58 adapted to be operated by an operating member $58_a$ for producing a signal utilized to charge the battery and to operate a water sprinkler 60 through a control panel 59.

When the measuring car 11 enters into the garage 53 as shown in FIG. 19, the first limit switch 52 mounted on the measuring car 11 is closed by the operating member $52_a$ for stopping the measuring car 11 while at the same time the battery 50 is connected to the pantograph 51, and the pantograph 51 is connected to the trolley wires 56. As a consequence, current from the battery 50 flows to the charging device 55 through pantograph 51, trolley wires 56 and cable 57. Although not shown in the drawing, the charging device is provided with a detector for detecting this current. On the other hand, the second limit switch 58 is closed by the operating member $18_a$ provided for the measuring car 11. In response to a signal produced by the second limit switch 58 and a signal produced by the current detector, a charging circuit is established in the charging device for charging the battery 50 through a circuit including cable 57, trolley wires 56 and pantograph 51. In response to a signal produced by the second limit switch 58, the sprinkler 60 sprinkles water onto the measuring car 11 under the control of the control panel 59, thereby cooling the battery. A predetermined time after commencement of the charging and splinkling, the charging and water sprinkling are stopped substantially at the same time by the operations of the timers, not shown, provided for the charging device 55 and the control panel 59. The measuring car with its battery thus charged can be used for the temperature measurement. When it becomes necessary to measure the temperature before completion of the charging, the measuring car can be started by an external instruction. In this case, both the first and second limit switches are opened to stop charging and sprinkling and the pantograph is disconnected from the battery.

As above described, as the measuring car 11 enters into the garage, it is automatically stopped to run by the first limit switch 52, and charging of the battery is automatically effected by the signal generated by the second limit switch 58 and the signal generated by the current detector which detects current from the battery 50. Moreover, as the charging is commenced by the operation of the second limit switch and by the detection of current from the battery which flows the same path as for the charging current, positive charging can be assured. The first limit switch 52 not only confirms the stopping of the measuring car 11 but also assures charging after the battery has been connected to the pantograph so that there is no fear that the charging device 55 operates during the running of the measuring car 11. Moreover, as the battery 50 is disconnected from the pantograph 51 there is no danger when an operator touches the trolley wires 56 or pantograph 51.

Figure 22:
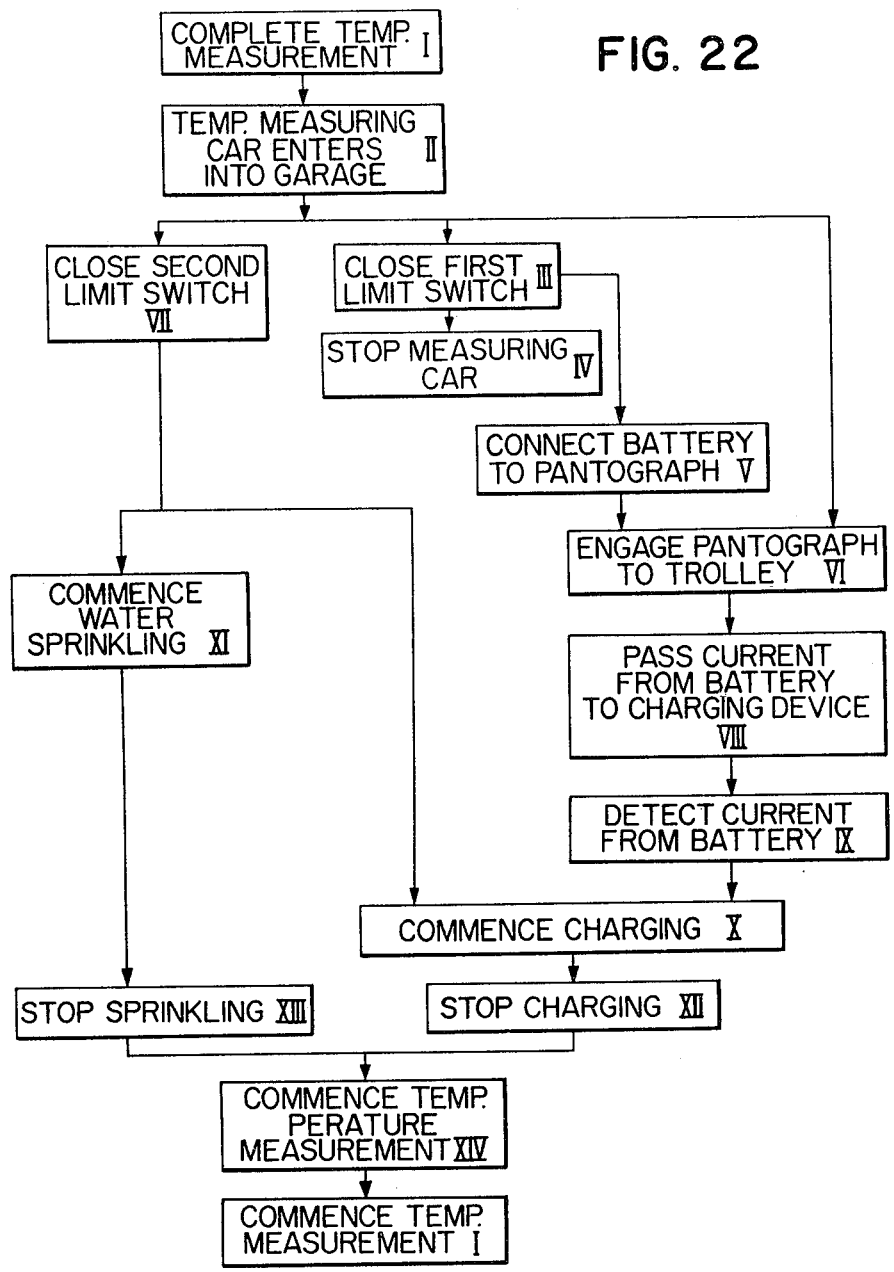
FIG. 22 is a flow chart useful to explain the operation of the automatic charging device.

FIG. 22 shows a flow chart showing the operation of the automatic charging device. More particularly, at step I temperature measurement is completed, and at step II, the measuring car enters into the garage. Then, at step III, the first limit switch 52 is closed so that the measuring car is stopped at step IV, and at step V the battery 50 is connected to the pantograph. When the measuring car stops at a predetermined position, the pantograph 51 engages the trolley wires 56 at step VI, whereby at step VIII current flows to the charging device 55 from the battery 50 and this current is detected at step IX. As the measuring car enters into the garage at step II, the second limit switch 58 is closed at step VII. Only when the steps IX and VII are executed charging of the battery is commenced at step X. When the second limit switch 58 is closed water sprinkling is commenced at step XI. The sprinkling and charging are stopped at steps XIII and XII after predetermined times $t_1$ and $t_2$ set by timers. Thereafter, the temperature measuring car is started at step XIV to start temperature measurement. Upon completion of a temperature measuring cycle at step I, the steps described above are repeated.

Any suitable switch means such as a photoelectric switch, or a proximity switch can be substituted for the limit switches and for their operating members for detecting positions.

As above described, according to this invention, since the measuring car runs independently of the coal loading car, it is possible to measure the oven temperature at any desired point. Moreover, as the opening and closing of the lids of flue nozzles and the temperature measurement therethrough can be made while the measuring car runs, it is possible to successively measure the temperature of respective combustion chambers. Further, the invention is applicable to any type of coke oven, and any type combustion to successively measure the temperature of the combustion chambers.

Further, according to a preferred embodiment of this invention, the maximum one of the data measured through a specific flue nozzle is used to represent the temperature of a combustion chamber provided with the specific flue nozzle so that it is easy to determine the temperature based on the measured data obtained at different points in the opening of the flue nozzle. Regardless of the difference in the temperature at various points, accurate measurement of the temperature is possible. Accordingly, it is possible to decrease the measuring time and to simplify the apparatus. Since the measuring car runs independently of the coal charging car it is not only possible to measure the temperature at a short period but also possible to measure the temperature at any desired time, thus enabling extremely fine control of the oven temperature. Moreover, as the temperature measuring apparatus of this invention can be used in combination with a charging car of a Rahmen construction the measuring car can be moved independently of the movement of the charging car. Further, as antennae are provided for the charging car and bleeders, it is possible to transmit measured data and an instruction irrespective of the relative position of the charging car and the measuring car. In addition, according to a preferred embodiment, a battery is mounted on the measuring car and the charging of the battery can be made automatically by detecting current flowing from the battery to the charging device.

We claim:

1. Apparatus for measuring temperature of coke ovens which are arranged in an array, each coke oven including a plurality of combustion chambers respectively provided with a plurality of flue nozzles at their tops, said apparatus comprising:
   rails disposed above said array and extending in a direction thereof or in a longitudinal direction of said combustion chambers;
   a measuring car continuously running on said rails;
   a temperature measuring member mounted on said measuring car for receiving thermal radiations emitted by said combustion chambers through said flue nozzles;
   radio transmitting means mounted on said measuring car for transmitting data measured by said temperature measuring member as an electric signal; and
   radio receiving means located in a remote control room for converting received electric signal into a signal representing measured temperature.

2. The temperature measuring apparatus according to claim 1 wherein each flue nozzle is closed by a lid made of heat resistant material permitting transmission of said thermal radiations.

3. The temperature measuring apparatus according to claim 2 wherein said measuring car is provided with means for cleaning said lid.

4. The temperature measuring apparatus according to claim 3 wherein said cleaning means comprises a brush carried by said measuring car for wiping an outer surface of said lid and a nozzle also carried by said measuring car for blasting pressurized gas against said outer surface wiped by said brush.

5. The temperature measuring apparatus according to claim 1, wherein each flue nozzle is provided with a swingable lid, and said measuring car is provided with lid opening and closing means engageable with said lid, whereby when said lid opening and closing means opens said lid, said temperature measuring member receives said thermal radiations.

6. The temperature measuring apparatus according to claim 5 wherein lids of respective flue nozzles are oriented such that said lids are opened only when said measuring car runs in a predetermined direction.

7. The temperature measuring apparatus according to claim 6 wherein each lid is pivotally mounted on each flue nozzle and a kick member is supported by said measuring car such that it can swing in only one direction.

8. The temperature measuring apparatus according to claim 7 wherein each lid is pivotally mounted on each flue nozzle through a pin, one end of an arm is secured to said pin, the other end of said arm is pivotally connected to a lever, said arm is provided with a stop and one end of said arm is provided with a linear portion arrested by said stop when said arm is rotated by said kick member and an arcuate portion which is not arrested by said stop.

9. The temperature measuring apparatus according to claim 7 wherein each lid comprises a flat disc shaped portion adapted to close and open said flue nozzle and a hook upwardly projecting from said flat disc shaped portion, and pivot pin for pivotally mounting said lid on said flue nozzle, and spring means for urging said lid toward closed position.

10. The temperature measuring apparatus according to claim 1 wherein said radio receiving means comprises means for sequentially comparing outputs successively produced by said temperature measuring member as said measuring car runs continuously and storing a larger one of compared outputs as a measured temperature.

11. The temperature measuring apparatus according to claim 1 wherein said coke oven array is provided with a coal charging car running in the same direction as said measuring car and of a Rahmen construction having a height sufficient to permit free passage of said measuring car beneath said coal charging car, and both of said coal charging car and said measuring car are provided with antennae so that said measuring car can communicate with said control room via said antennae regardless of a relative position of said coal charging car and said measuring car.

12. The temperature measuring apparatus according to claim 1 wherein said measuring car is provided with a storage battery for driving the same, and wherein a garage is installed near one end of said array for housing said measuring car, said garage comprising means for charging said storage battery, and means responsive to current flowing from said storage battery to said charging means for causing the same to charge said storage battery.

* * * * *

UNITED STATES PATENT AND TRADEMARK OFFICE
CERTIFICATE OF CORRECTION

PATENT NO.   : 4,447,805
DATED        : May 8, 1984
INVENTOR(S)  : Yoshihiro Omae et al It is certified that error appears in the above-identified patent and that said Letters Patent is hereby corrected as shown below:

The sheets of drawing consisting of Figures 1 and 2 should be added as per attached sheets.

UNITED STATES PATENT AND TRADEMARK OFFICE
CERTIFICATE OF CORRECTION

PATENT NO. : 4,447,805
DATED : May 8, 1984
INVENTOR(S) : Yoshihiro Omae et al

It is certified that error appears in the above—identified patent and that said Letters Patent is hereby corrected as shown below:

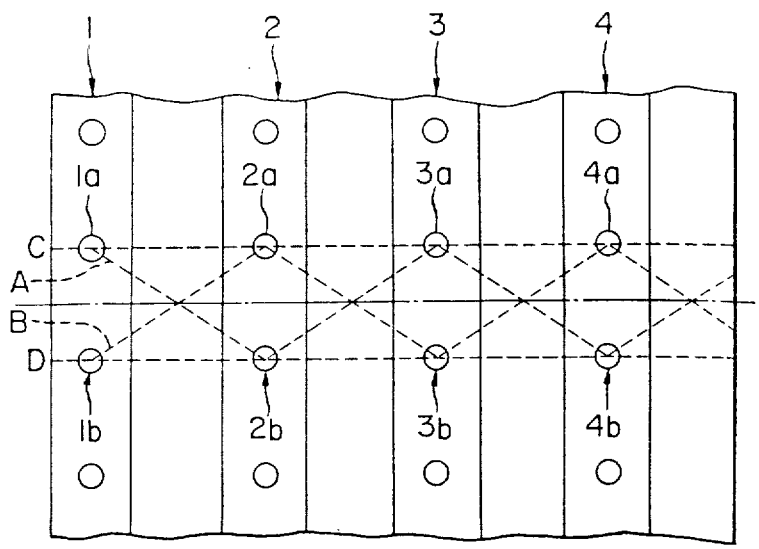

FIG. 1
PRIOR ART

UNITED STATES PATENT AND TRADEMARK OFFICE
CERTIFICATE OF CORRECTION

PATENT NO. : 4,447,805  
DATED : May 8, 1984  
INVENTOR(S) : Yoshihiro Omae et al Page 3 of 3

It is certified that error appears in the above—identified patent and that said Letters Patent is hereby corrected as shown below:

FIG. 2

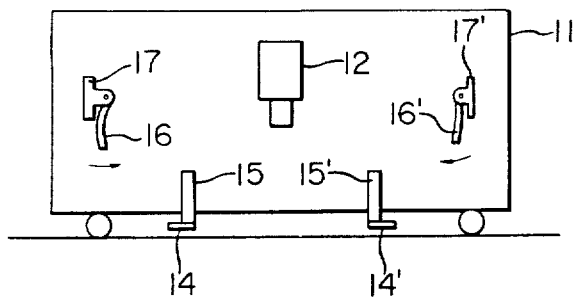

Signed and Sealed this

Seventeenth Day of June 1986

[SEAL]

*Attest:*

DONALD J. QUIGG

*Attesting Officer*  *Commissioner of Patents and Trademarks*